Dec. 19, 1933.   F. SCHANLEY   1,940,062
DEFROSTING ATTACHMENT FOR TRANSPARENT BODIES
Filed June 1, 1932   2 Sheets-Sheet 1

Inventor
*Floyd Schanley*

*Geo. S. Kimmel*
Attorney

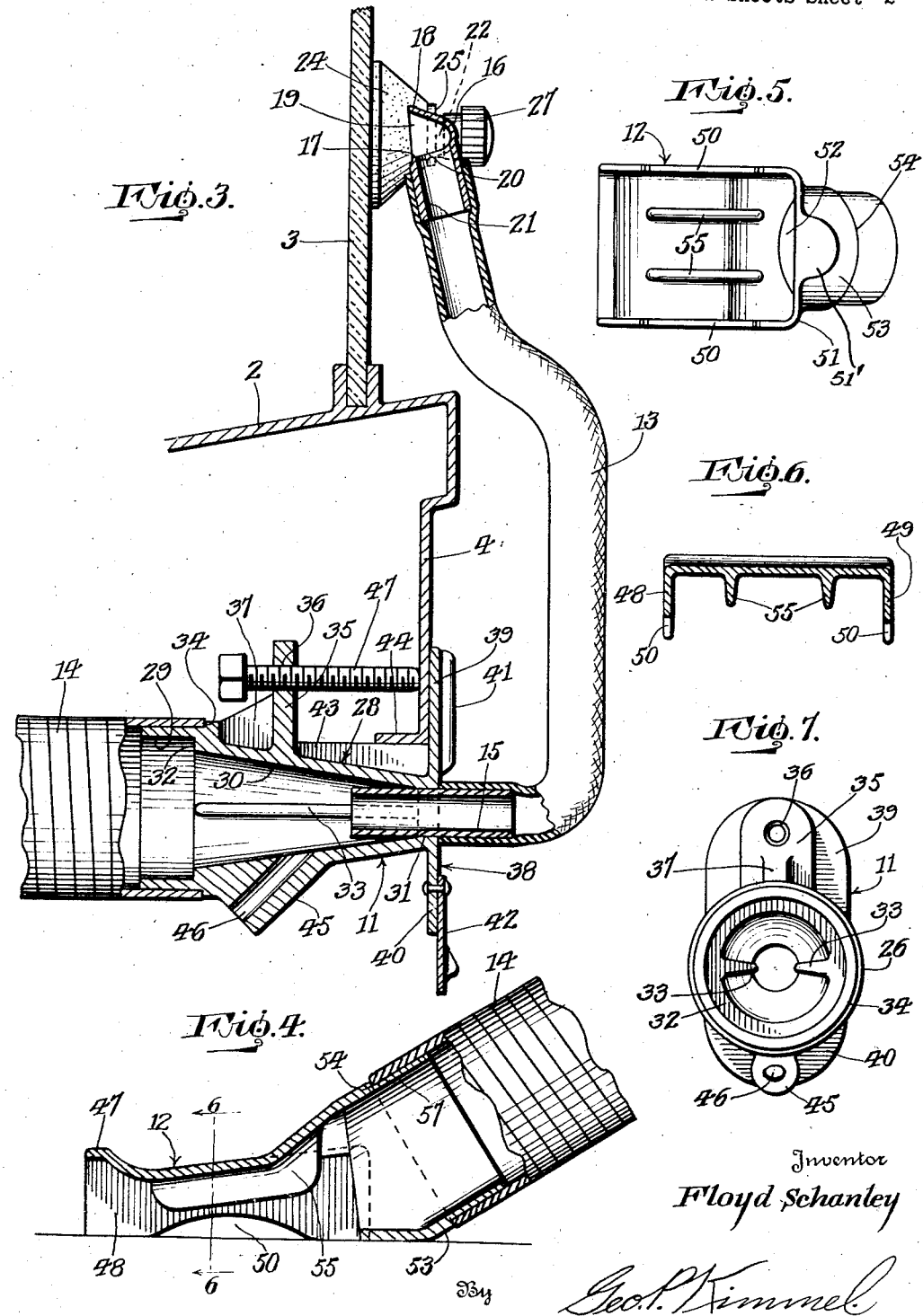

Patented Dec. 19, 1933

1,940,062

UNITED STATES PATENT OFFICE 1,940,062

DEFROSTING ATTACHMENT FOR TRANSPARENT BODIES

Floyd Schanley, Pottstown, Pa.

Application June 1, 1932. Serial No. 614,804

11 Claims. (Cl. 20—40.5)

This invention relates to a de-frosting attachment for transparent bodies, and is designed primarily for use in connection with the glasses of windshields of automotive vehicles, but it is to be understood that a de-frosting attachment, in accordance with this invention, may be employed in any connection for which it is found applicable, and the invention has for its object to provide, in a manner as hereinafter set forth, an attachment of the class referred to for maintaining proper ventilation and temperature on the inside surface of a transparent body, especially a windshield glass, so that under adverse weather conditions such body will not be overloaded or covered with frost, snow or ice, or other elements of nature, either while the body be stationary or during movement of a vehicle carrying the latter thereby resulting in clear vision to the operator of the vehicle and providing for safety during the travel of the latter.

Further objects of the invention are to provide, in a manner as hereinafter set forth, a de-frosting attachment for the purpose referred to, which is simple in its construction and arrangement, strong, durable, compact, thoroughly efficient in its use, conveniently installed with respect to the transparent body with which it is to be used, readily assembled and comparatively inexpensive to manufacture.

To the above ends essentially, and to others which may hereinafter appear, the invention consists of such parts and such combination of parts, which fall within the scope of the invention as claimed.

In the drawings:

Figure 3 is a fragmentary view partly in vertical section, and partly in side elevation of the attachment, and showing the adaptation thereof with respect to the windshield glass of an automotive vehicle.

Figure 4 is a fragmentary view of the attachment illustrating the intake end thereof.

Figure 5 is an inverted plan of the combined air intake, air heating and heat retaining element employed at the intake end of the attachment.

Figure 6 is a cross sectional view of the element shown in Figure 5.

Figure 7 is an elevation looking towards the forward end of the mixing chamber forming element.

Figure 1:
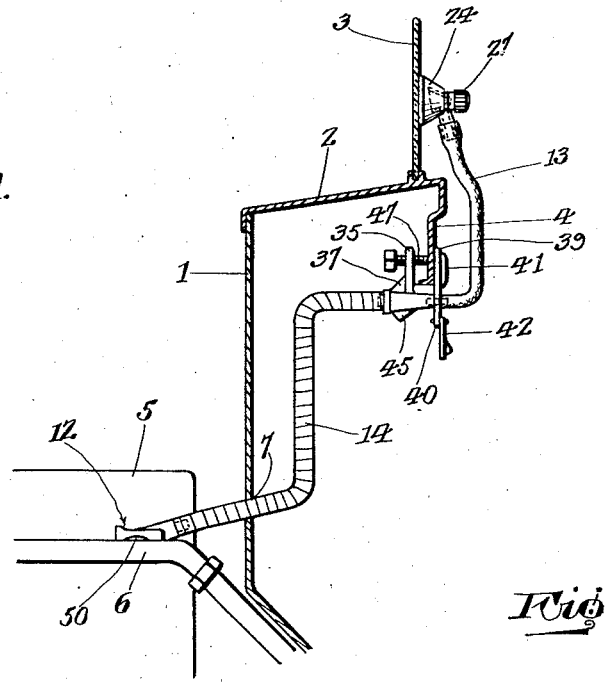
Figure 1 is a side elevation of a de-frosting attachment in accordance with this invention and showing by way of example, the adaptation thereof with respect to a windshield glass of an automotive vehicle.
Figure 2:
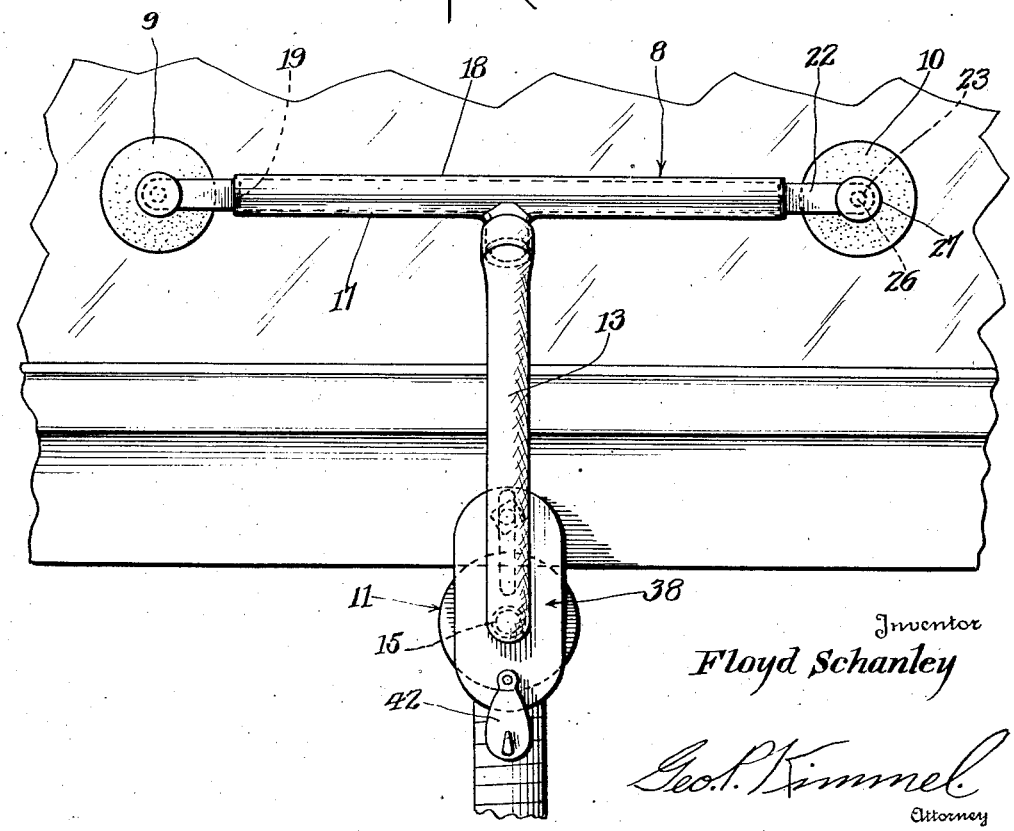
Figure 2 is a fragmentary view in rear elevation of the windshield glass showing the adaptation therewith of the nozzle element of the attachment.

There is illustrated, by way of example, for the purpose of showing the attachment in defrosting position, the dash 1, cowl 2, windshield glass 3, instrument panel 4, engine block 5 and exhaust pipe 6 of an automobile. The dash 1 has an opening 7.

The attachment includes a nozzle element 8, a pair of coupling devices 9, 10 for detachably connecting the element 8 in opposed spaced relation with respect to the rear face of glass 3, a mixing chamber forming element 11, a combined air intake, air heating and heat confining element 12 a flexible hot air conducting pipe 13 between elements 8 and 11, a flexible heat conducting pipe 14 between elements 11 and 12 and a tubular coupling 15 between elements 8 and 11.

The element 8 is of any length desired and includes an open front body part formed of a curved back 16, bottom and top walls 17, 18 respectively which diverge with respect to each other, and a pair of end walls 19. The body part of element 8 is of flaring cross section and centrally of the bottom wall 17 an opening 20 is formed with which registers a depending tubular extension 21. Integral with each end wall 19 and extending outwardly therefrom and lengthwise with respect to said body part is a rectangular arm 22 standing on its lower lengthwise edge and formed in proximity to its outer end with an opening 23.

Each coupling device includes a suction cup 24 formed at its back with an abutment disc 25 from which extends rearwardly a threaded stem 27 for passage rearwardly through an opening 23 to position an arm 22 against disc 25. Carried by and threadedly engaging with the stem 26 is a clamping nut 27 binding against the rear face of the arm 22 for clamping the latter against disc 26 and connecting the coupling device to the element 8. The devices 9, 10 detachably connect the nozzle element 8 to the glass 3 by suction and further maintain the mouth of such element in spaced relation with respect to the glass. The mouth of nozzle element 8 is provided by the open front of said body part.

The mixing chamber forming element 11 comprises a tubular casting 28 having the portion 29 of its inner face of uniform diameter and the portion 20 of its inner face gradually decreasing in diameter from portion 29 to a point in proximity to the rear end of the casting. That part 31 of the inner face of casting 28 into which part 30 merges is of uniform diameter and of materially less diameter than portion 29. The forward end of portion 30 is of less diameter than the rear end of portion 29 thereby providing the casting with an internal annular abutment or deflector 32. The portion 30 of the inner face of casting 28 provides a mixing chamber and has its wall formed with diametrically opposed heat retaining fins 33 of tapered cross section extending lengthwise of such wall. The casting 28 in proximity to its rear end is formed with an annular peripheral shoulder 34 and forwardly of the latter and on its top with a vertically disposed arm 35 provided near its upper end with an opening 36 formed with a threaded wall. A reinforcing web 37 is provided for arm 35. At its rear end casting 28 has a vertically disposed oval-shaped flange 38 extending above and depending below such end. The upper part 39 of flange 38 is of greater length than the lower part 40 of the latter. The part 39 on its rear face has a reinforcing web 41. The part 40 carries a pivoted closure 42 for closing the open rear end of the heating chamber when desired. The casting 28 has its top formed with a lengthwise web 43 extending from arm 35 to part 39 of flange 38, and such web 43 provides a seat for a forwardly directed flange 44 at the bottom of panel 4. Casting 28 has its bottom provided with a depending extension 45 formed with a rearwardly extending and upwardly inclined port or channel 46 which opens into the heating chamber. A clamping screw 47 is carried by arm 35. Element 11 is to be positioned against flange 44 and with upper part 39 arranged against the rear face of panel 4. The screw 47 is then adjusted against the forward face of panel 4 for clamping, in connection with flange 38 casting 28 to and in depending position with respect to the bottom of panel 4.

The combined air intake, air heating and heat retaining element 12 is formed from a one-piece casting having the major portion of its length of inverted U-shape in transverse section and such portion is substantially rectangular in plan and open at its forward end. The said portion comprises a top wall 47 and a pair of side walls 48, 49. The top wall has a depressed intermediate part. Each side wall at its center has its lower part cut out to provide a segmental shaped inlet 50. The casting includes a transverse wall 51 formed centrally with a flat rearward extension 51'. The wall 51 connects the rear ends of the walls 47, 48 and 49 together. The said walls 47, 48, 49 and 51 provide a heating confining chamber for heating air. The extension 51' has its lower face flush with the bottom edges of the walls 48, 49 and 51. The wall 51 is formed with an outlet opening 52. Integral with the rear face of wall 51 is an upwardly inclined tubular extension 53 formed intermediate its ends with an annular peripheral shoulder 54. Integral with and depending from the inner face of the top wall 47 are spaced heat retaining fins 55.

The upper end of pipe 13 is connected and encompasses the extension 21. The lower end of pipe 13 is connected with element 11 and for such purpose a removable tubular coupling member 56 is employed. The member 56 seats on the part 31 of the inner face of casting 28 and extends into the heating chamber and projects from the rear end of element 11. The lower end of pipe 13 is attached to and encompasses that part of member 56 which extends rearwardly from the element 11. When the nozzle element and pipe 13 are not used the member 56 is removed from element 11 and the rear end of casting 28 or heating chamber provided by the latter is shut by the closure 42.

The pipe 14 is in the form of a flexible metallic tubing or shafting, extends through opening 7, has its inner end attached to and encompasses the forward end of element 11 and has its forward end attached to and encompasses that part of extension 47 of reduced outer diameter of extension 53.

The intake element 12 is mounted upon and suitably secured to discharge pipe 6 of the engine of the vehicle.

The chamber provided by casting 26 is heated with heated air conducted by pipe 14 and such heated air is drawn into said chamber by suction. The suction is created by a vacuum produced by a current of cold air through port or channel 46.

The attachment provides for proper atmospheric air conditions and circulation to produce the proper or necessary temperature required on the inside surface of the transparent body to provide for de-frosting the latter without danger of overheating or breaking such body.

What I claim is:—

1. In a de-frosting attachment for transparent bodies, a hollow open bottom chambered combined air intake, air heating and heat retaining element for seating upon a heat supplying medium therefor and open throughout its forward end, a flexible tubular member attached at one end to the rear end of and permanently communicating with the chamber of said element, a tubular combined mixer and vacuum creating element permanently communicating intermediate its ends with the atmosphere and attached at its forward end to the other end of and communicating with said member, a tubular conductor, a heated air discharging nozzle attached to one end of and communicating with said conductor, and a sleeve arranged within and extending from the rear end of the combined mixer and suction creating element into said conductor for coupling the latter to the former.

2. In a defrosting attachment for transparent bodies, a hollow open bottom chambered combined air intake, air heating and heat retaining element for seating upon a heat supplying medium therefor and open throughout its forward end, a flexible tubular member attached at one end to the rear end of and permanently communicating with the chamber of said element, a tubular combined mixer and vacuum creating element permanently communicating intermediate its ends with the atmosphere and attached at its forward end to the other end of and communicating with said member, a tubular conductor, a heated air discharging nozzle attached to one end of and communicating with said conductor, a sleeve arranged within and extending from the rear end of the combined mixer and suction creating element into said conductor for coupling the latter to the former, and said combined mixer and suction creating element having coacting parts, one adjustable relative to the other for detachably anchoring such elements stationary.

3. In a de-frosting attachment for transparent bodies, a chambered open bottom combined air intake, air heating and heating retaining element for seating upon a heat supplying medium therefor and having its sides provided with air intakes, a tubular combined mixer and vacuum creating element permanently communicating intermediate its ends with the atmosphere and having a reduced rear end, a flexible tubular conducting member interposed between, connected to and opening into said elements, a heated air discharging nozzle, a sleeve mounted in and extending from the reduced end of said combined mixer and vacuum creating element, and a flexible tubular conducting member interposed between and connected to said sleeve and nozzle.

4. In a de-frosting attachment for transparent bodies, a chambered open bottom combined air intake, air heating and heating retaining element for seating upon a heat supplying medium therefor and having its sides provided with air intakes, a tubular combined mixer and vacuum creating element permanently communicating intermediate its ends with the atmosphere and having a reduced rear end, a flexible tubular conducting member interposed between, connected to and opening into said elements, a heated air discharging nozzle, a sleeve mounted in and extending from the reduced end of said combined mixer and vacuum creating element, a flexible tubular conducting member interposed between and connected to said sleeve and nozzle, and said combined mixer and suction element having coacting parts, one adjustable relatively to the other for detachably anchoring such element to a support.

5. In a de-frosting attachment for transparent bodies, a tubular combined mixer and vacuum creating element adapted to communicate at its forward end with a heated air source and at its rear end with a heated air conducting off means, said element having an annular forward end part and a tapered part extending rearwardly from said other part, said tapered part having a depending enlargement formed with a permanently open port extending entirely therethrough, said port opening into said tapered part intermediate the ends of the latter and providing for establishing permanent communication between the interior of said element and the atmosphere.

6. In a de-frosting attachment for transparent bodies, a tubular combined mixer and vacuum creating element adapted to communicate at its forward end with a heated air source and at its rear end with a heated air conducting off means, said element having an annular forward end part and a tapered part extending rearwardly from said other part, said tapered part having a depending enlargement formed with a permanently open port extending entirely therethrough, said port opening into said tapered part intermediate the ends of the latter and providing for establishing permanent communication between the interior of said element and the atmosphere, said port extending upwardly and inclining rearwardly from its outer to its inner end.

7. In a de-frosting attachment for transparent bodies, a tubular combined mixer and vacuum creating element adapted to communicate at its forward end with a heated air source and at its rear end with a heated air conducting off means, said element for a portion of its length being tapered, said tapered portion permanently communicating intermediate its ends with the atmosphere and provided on its inner face with spaced fins.

8. In a de-frosting attachment for transparent bodies, a tubular combined mixer and vacuum creating element adapted to communicate at its forward end with a heated air source and at its rear end with a heated air conducting off means, said element for a portion of its length being tapered, said tapered portion permanently communicating intermediate its ends with the atmosphere and provided on its inner face with spaced fins, and said tapered portion being provided with coacting parts, one adjustable relative to the other for detachably anchoring said element stationary to a support.

9. In a de-frosting attachment for transparent bodies, an open bottom and open front chambered combined air intake, air heating and heat retaining element for seating upon a heat supplying medium therefor, a tubular combined mixer and vacuum forming element permanently communicating intermediate its ends with the atmosphere, a sleeve mounted in and extending rearwardly from said combined mixer and vacuum forming element, a heated air discharging nozzle, means for establishing communication between said nozzle and said sleeve, and means for establishing communication between said elements.

10. In a de-frosting attachment for a transparent body, means for conducting heated air from a heated air source to a point of discharge with relation to the transparent body, said means having interposed therein a tubular structure formed with a tapered part to provide a horizontally disposed mixing chamber gradually decreasing in diameter from its intake to its outlet end, said structure being formed with a permanently open port to permanently establish communication between the atmosphere and the bottom of said chamber, intermediate the ends of the latter to provide for a continuous current of cool air entering the chamber for creating a suction to draw the heated air into said chamber from the intake end of the latter.

11. In a de-frosting attachment for a transparent body, means for conducting heated air from a heated air source to a point of discharge with respect to the transparent body, said means having interposed therein adjacent its ends and as a part thereof a tubular structure formed with a horizontally disposed mixing chamber gradually decreasing in diameter from its intake end to its outlet end, said structure being formed with a permanently open upstanding port inclining rearwardly from its outer to its inner end and opening at its inner end into said chamber, said port permanently establishing communication between the atmosphere and said chamber and providing for a continuous current of cool air entering the chamber for creating a suction to draw the heated air into said chamber from the intake end thereof.

FLOYD SCHANLEY.